United States Patent [19]

Beccaris

[11] 4,403,685

[45] Sep. 13, 1983

[54] CLUTCH RELEASE BEARING

[75] Inventor: Carlo Beccaris, Santena, Italy

[73] Assignee: Valeo Societe Anonyme, Paris, France

[21] Appl. No.: 221,049

[22] Filed: Dec. 29, 1980

[51] Int. Cl.³ .............................................. F16D 23/14
[52] U.S. Cl. .................... 192/98; 192/110 B
[58] Field of Search ..................... 192/98, 110 B, 99 S; 308/233

[56]  References Cited

U.S. PATENT DOCUMENTS

| 2,157,429 | 5/1939 | Padden ................................. 192/98 |
| 3,277,988 | 10/1966 | Pitner ............................ 192/99 S X |
| 3,333,664 | 8/1967 | Chapaitis ............................... 192/98 |
| 3,390,927 | 7/1968 | Adams ............................ 308/233 X |
| 3,904,008 | 9/1975 | Sonnerat .................................. 192/98 |
| 3,967,710 | 7/1976 | Ernst et al. ............................ 192/98 |
| 4,029,186 | 6/1977 | De Gennes ............................. 192/98 |
| 4,042,086 | 8/1977 | Ernst et al. ............................. 192/98 |
| 4,046,436 | 9/1977 | Brown .................................. 308/233 |
| 4,340,135 | 7/1982 | Olschewski et al. ................. 192/98 |

FOREIGN PATENT DOCUMENTS 2255502  7/1975  France .

Primary Examiner—Rodney H. Bonck
Attorney, Agent, or Firm—Charles E. Brown

[57]  ABSTRACT

A clutch release bearing is disclosed comprising an operating element having a transverse annular flange, a bearing plate lining one side of the annular flange and clips being provided for a relative elastic snap-fit engagement on the associated clutch fork. The clips are independent, generally U-shaped parts having a bight portion which is interposed between the bearing plate and the transverse annular flange of the operating element under a radial lug of the bearing plate. Alternatively, the bight portion extends on the side of the transverse annular flange remote from the bearing plate.

13 Claims, 10 Drawing Figures

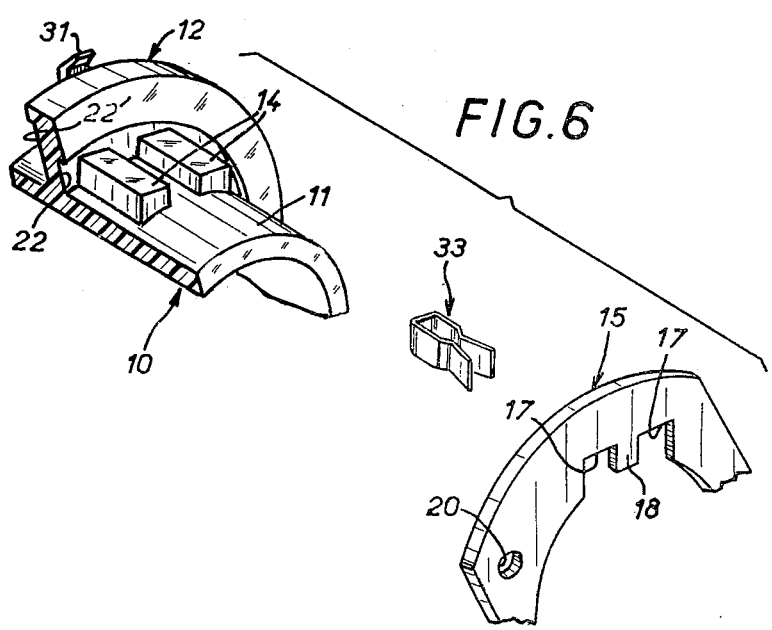

CLUTCH RELEASE BEARING

The present invention relates in general terms to clutch release bearings, that is to say devices which are intended to act on the disengaging mechanism of a clutch, in particular for a motor vehicle.

As is known, a clutch release bearing of this type substantially comprises, on the one hand, an operating element which is intended to be operated by a control member, in practice a clutch fork, and, on the other hand, a drive element which, under the action of the operating element, is intended to act on the disengaging mechanism of the clutch in question, and which is free to rotate relative to the operating element, while being connected axially thereto.

In one known kind of self-centering clutch release bearing, the drive element is biased by axially acting elastic or resilient means toward a transverse annular flange on the operating element; and if the drive element is misaligned relative to the operating element, it admits of radial shifting for self-centering in any direction perpendicular to the axis of the operating element in the course of clutch disengagement.

The drive element bears on one side of the annular flange of the operating element. The control member acts on the other side of this annular flange.

This annular flange often belongs to a part made of synthetic material.

In this case, in order to prevent it from being damaged by the control member, it is most often lined on its surface by a bearing plate which is capable of contact with said control member.

Also in this case, the synthetic part to which the annular flange of the operating element belongs also most often has substantially axial bosses, with which said annular flange is integral and which are capable of circumferentially retaining the clutch release bearing relative to the control member and hence of locking this clutch release bearing against rotation thereon.

Moreover, it is often desirable to be able to snap the clutch release bearing into engagement with the control member which is intended to act thereon, in order to enable the assembly to be handled without risk of dropping it.

This is the case, in particular, when the clutch release bearing is fitted on the casing of a gearbox, with the control member associated therewith, and when the gearbox equipped in this way is to be transported individually before being inserted in the drive chain of which it forms part.

Admittedly, it has been proposed, particularly in the French Patent filed under No. 74/39,386 and published under No. 2,255,502, to permit this snap-fit engagement of the clutch release bearing onto the control member associated therewith by providing this clutch release bearing with clips having elastically deformable wings which enable the clutch release bearing to engage on this control member.

However, apart from the fact that this French patent relates to a clutch release bearing made specifically of metal and not therefore possessing a bearing plate, the clips used with the clutch release bearing are integral with grippers which couple axially together the two principal constituent elements of this clutch release bearing.

The result is that it is relatively complicated to manufacture such clips and grippers conjointly.

In general terms, the object of the present invention is, in a clutch release bearing using a bearing plate, to exploit the presence of this bearing plate for the simple and economic manufacture of clips which permit the snap-fit engagement of this clutch release bearing onto the control member associated therewith.

More precisely, the present invention relates to a clutch release bearing of the kind comprising an operating element which is intended to be operated by a control member, in practice a clutch fork, and a drive element which, under the action of the operating element, is intended to act on the disengaging mechanism of a clutch, said operating element comprising, for the action of the control member, a transverse annular flange lined on its surface by a bearing plate which is capable of contact with said control member, in combination with clips having elastically deformable lateral wings which permit the elastic snap-fit engagement of the clutch release bearing onto said control member, each of said clips constituting an independent, generally U-shaped part.

Clips of this kind are manufactured economically and fitted easily.

For example, the middle zone of the U-shaped part formed by a clip can be inserted between the bearing plate and the transverse flange of the operating element, under a radial lug on said bearing plate.

In this case, the clip is fitted either directly in contact with the annular flange of the operating element or on the bearing plate before this is applied against the flange.

Alternatively, the middle zone of the U-shaped part formed by a clip extends on that side of the annular flange of the operating element which is turned axially towards the drive element, and the wings of said U-shaped part pass axially, on the one hand, through said annular flange, and, on the other hand, through the bearing plate.

In all cases, since the operating element possesses, for each clip, two substantially axial bosses which are capable of circumferentially retaining the clutch release bearing relative to the control member, the wings of a clip according to the invention extend, in practice, axially and parallel to said bosses and, in practice, in contact with these, so that these wings advantageously protect the corresponding faces of these bosses from the control member.

According to a development of the invention, the wings of a clip of this type each have, additionally, along their edge, a right-angled flange which extends above the corresponding axial boss, so that they likewise protect the corresponding faces of these bosses from the control member.

Thus, a clip according to the invention can fulfil a threefold function, namely the elastic snap-fit engagement of the clutch release bearing onto the control member associated therewith, the protection, from the control member, of a first face of each boss which this clutch release bearing possesses to lock it against rotation on said control member, and the protection, likewise from the control member, of a second face of each of said bosses, which is distinct from the preceding face.

According to another development of the invention the clip can, if desired, also fulfill an additional function, namely that of ensuring by itself the axial retention of the bearing plate against the annular flange of the operating element or of participating in this retention.

The characteristics and advantages of the invention will moreover become apparent from the description which now follows, by way of example, with reference to the attached schematic drawings, in which:

FIG. 1 is a view in axial section of a clutch release bearing according to the invention, taken along the line I—I of FIG. 2;

FIG. 2 is a view in side elevation of this clutch release bearing, taken in the direction of the arrow II of FIG. 1;

FIG. 3 is a partial plan view of the bearing, taken in the direction of the arrow III of FIG. 2;

FIG. 4 is a partial view in section of the bearing, taken along the line IV—IV of FIG. 2;

FIG. 5 is, on a larger scale, a perspective view of one of the clips used in the clutch release bearing according to the invention;

FIG. 6 is, on a different scale, a partial exploded view in perspective of this clutch release bearing, illustrating a possible method of assembly thereof;

FIG. 7 is a view equivalent to that of FIG. 5, showing a different embodiment of the clip in question.

Figure 8:
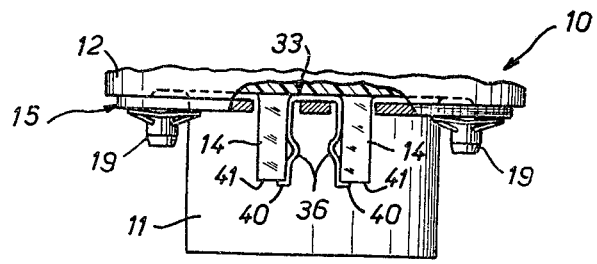
FIGS. 8 to 10 are, with local cutaway portions, views equivalent to that of FIG. 3, each relating respectively to a different embodiment.

These Figures illustrate, by way of example, the application of the invention to a self-centering clutch release bearing.

In the embodiment illustrated, this self-centering bearing possesses an operating element 10 which is made of synthetic material and which thus consists, in a single unit, on the one hand of a sleeve 11 which permits its engagement on the casing conventionally surrounding the output shaft of a gearbox, and on the other hand of a transverse annular flange 12 which is intended to be acted on by a control member.

This control member is conventionally a clutch fork.

A clutch fork of this kind does not form part of the present invention and will not therefore be described in detail here.

It is sufficient to explain that it is made, for example, of suitably shaped sheet metal and has two projecting actuating fingers directed radially towards each other, these fingers being provided on the inner periphery of an opening via which the clutch fork is engaged on the sleeve 11 of the clutch release bearing in question; one of these fingers is shown in broken lines in FIG. 3 by reference numeral 13.

For interaction with these fingers 13 of the control member, the sleeve 11 of the operating element 10 has, on its outer surface, two pairs of axial bosses 14 which project in diametrically opposed positions and which are each capable of enclosing a finger 13 of this type.

These axial bosses 14 extend from the annular flange 12 and are thus integral therewith.

In practice, in order to protect the annular flange 12 from the axial action of the fingers 13 of the control member, this annular flange 12 is lined on its surface by a bearing plate 15 surrounding the sleeve 11 annularly; in the embodiment illustrated, this bearing plate 15 is truncated, its outer contour having two parallel rectilinear edges 16.

To enable it to engage axially on the bosses 14 of the sleeve 11, the bearing plate 15 has, in diametrically opposed positions, two pairs of notches 17 which form between them two radial lugs 18 directed away from one another.

In order to retain the bearing plate 15 axially against the annular flange 12 of the operating element 10, in the embodiments illustrated in FIGS. 1 to 9, the operating element has, in diametrically opposed positions, two integral projecting pegs 19 which extend substantially parallel to the axis of the assembly and on which the bearing plate 15 is axially engaged via openings 20 which it possesses for this purpose, the plate 15 being retained by interaction with elastic rings 21 which are force-fitted over the pegs 19 beyond the bearing plate 15 and which, being anchored in said pegs 19, apply this bearing plate 15 elastically in contact with the annular flange 12 and thereby lock the plate against translation.

Recessed axially in relation to its front surface with which the bearing plate 15 is in contact, the annular flange 12 has, at the margin of the sleeve 11, an annular recess 22 whose function will be explained below; likewise, recessed axially in relation to its opposite front surface, the annular flange has an annular recess 22'.

Associated wth the operating element 10 is a drive element 24 which is intended to act conventionally on the disengaging mechanism of a clutch, under the action of the operating element 10.

In the embodiment illustrated and in a manner known per se, this drive element 24 consists of a ballbearing whose outer race 25 is axially in contact with the annular flange 12 of the operating element 10, on the side of the latter which is opposite the bearing plate 15, and whose inner race 26 projects axially forwards, for acting on the disengaging mechanism of the clutch in question.

A cover 27 connects the drive element 24 axially to the operating element 10.

In the embodiment illustrated and in a manner known per se, this cover 27 comprises a front wall 28, which itself forms axially acting elastic means by constituting, for example, as illustrated, a corrugated washer of the "ONDUFLEX" type and which, bearing on the front section of the outer race 25 of the ballbearing constituting the drive element 24, applies the latter axially against the annular flange 12 of the operating element 10, and, integral with this front wall 28, a plurality of axial lugs 29 which each have, in the vicinity of their end, an opening 30, via which they are engaged on hook-shaped projections 31 integral with the operating element 10.

According to the invention, these hook-shaped projections 31 are provided at intervals on the periphery of the annular flange 12 of the operating element 10 and integral therewith.

Alternatively and in a manner known per se, the hook-shaped projections 31 could admittedly be formed on the periphery of the bearing plate 15.

However, the above-described arrangement implies that the annular flange 12 of the operating element 10 assumes two distinct functions, namely that of retaining the cover 27 and that of retaining the bearing plate 15.

In other words, these two functions are, in this case, advantageously dissociated.

The length of the axial lugs 29 of the cover 27 is advantageously reduced, which provides a corresponding saving of metal.

With a self-centering bearing, the drive element 24 is allowed free radial play, both on the side where the sleeve 11 of the operating element 10 is located and on the side where the axial lugs 29 of the cover 27 are located, so that this drive element 24 has, radially, an omnidirectional freedom of movement, relative to the operating element 10, in contact with the annular flange 12 thereof, under the control of the elastic clamping generated with respect thereto by the corrugated front wall 28 of the cover 27.

Moreover, in a manner known per se, an annular protective cover 32 is engaged on the drive element 24 between its inner race 26 and the front wall 28 of the cover 27.

According to the invention, clips 33 are provided for an elastic snap-fit engagement of the clutch release bearing in question onto the control member with which it is associated, and, more precisely, onto the fingers 13 thereof.

A clip 33 of this type is provided for each of these fingers 13.

According to the invention, each clip is an independent, generally U-shaped part, which is illustrated separately in FIG. 5.

The clip 33 according to the invention therefore comprises, as a single unit, on the one hand, a middle zone 34, and, on the other hand, two elastically deformable wings 35, whose ends, which are shaped dihedrally for this purpose and are directed away from one other, jointly constitute a neck of reduced width 36; such a clip 33 is made, for example, of metal.

In the embodiments illustrated in FIGS. 1 to 9, each clip 33 is inserted by its middle zone 34 between the bearing plate 15 and the annular flange 12 of the operating element 10, under the corresponding radial lug 18 of this bearing plate 15, by means of the annular recess 22 which is set back axially in said annular flange 12.

In practice, the elastically deformable wings 35 of a clip 33 extend axially, parallel to the corresponding axial bosses 14 and in contact with these bosses, between the latter, while passing axially through the bearing plate 15 by means of its notches 17.

As illustrated in FIG. 6, the clips 33 can be fitted on the operating element 10 before the bearing plate 15 is engaged thereon.

Alternatively, they can be fitted on the bearing plate 15 before this is engaged on the operating element 10.

In any event, once the bearing plate 15 has been joined to the operating element 10, the clips 33 according to the invention are firmly fixed to the operating element.

As will easily be understood, when the control member associated with the clutch release bearing is engaged axially thereon, the fingers 13 of this control member must elastically pass beyond the neck 36 of the corresponding clip 33 until they bear on the radial lugs 18 of the bearing plate 15, and, after such an engagement, the control member is connected axially to the clutch release bearing.

As a result, the assembly formed in this way by the clutch release bearing and its control member can be handled jointly without the risk that the control member may become disengaged from the clutch release bearing.

As will easily be understood, in operation, the wings 35 of each clip 33 protect the axial bosses 14 of the operating element 10 from the corresponding finger 13 of the control member, since these wings line, on the surface, the faces of these axial bosses on which this finger would normally be capable of acting by its edge.

According to the different embodiment illustrated in FIG. 7, equivalent protection is provided for those of the faces of the axial bosses 14 which are at right angles to the preceding faces and on which the control member can normally act by way of the edge of the central opening via which it is engaged on the operating element 10.

According to this different embodiment, the wings 35 of a clip 33 each have a right-angled flange 38 along their edge.

As will easily be understood, when a clip 33 is in place between two axial bosses 14, its right-angled flanges 38, which extend in opposite directions to one another, extend above these bosses 14 and therefore protect them.

According to the different embodiment illustrated in FIG. 8, at least one of the wings 35 of the U-shaped part formed by a clip 33, and, in practice, each of these, is, at its free end, turned back transversely into a right-angled flange 40 in contact with the end edge 41 of the corresponding axial boss 14 of the operating element 10.

It is thereby retained in a reinforced manner.

Figure 9:
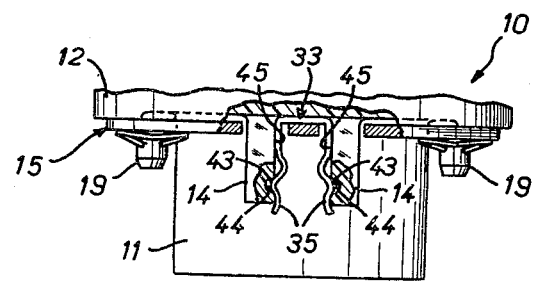

Alternatively, according to FIG. 9, additional engaging means are provided for the same purpose between, on the one hand, at least one of its wings 35, and, in practice, each of these, and, on the other hand, the corresponding axial boss 14 of the operating element 10.

In the embodiment illustrated in this FIG. 9, these additional engaging means comprise, for a wing 35 of the clip 33, a projection 43 in the middle zone of this wing and, for the corresponding axial boss of the operating element 10, a recess 44 which is provided for this purpose as a hollow in the corresponding side 45 of this boss and which permits the elastic snap-fit engagement of the projection 43.

For example and as illustrated, such a projection 43 can be obtained very simply by local deformation of the respective wing 35.

Figure 10:
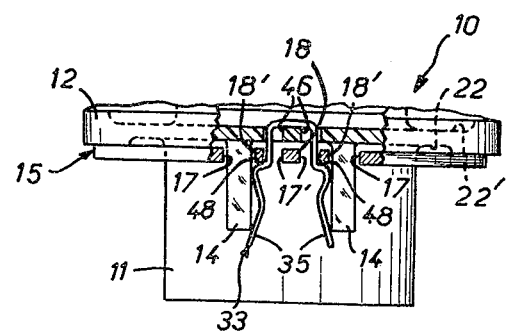

In the different embodiment illustrated in FIG. 10, the middle zone of the U-shaped part formed by a clip 33 extends on that side of the annular flange 12 of the operating element 10 which is turned axially towards the drive element 24, that is to say on the side of this flange opposite that on which the axial bosses 14 are located, the wings 35 of this clip passing axially, on the one hand, through the annular flange 12 by means of passages 46 made for this purpose in the flange at the margin of the sleeve 11, and, on the other hand, through the bearing plate 15 by means of passages likewise made for this purpose therein, these being, in fact, notches 17 made on the inner periphery of this bearing plate 15.

To insert the middle zone of the clips 33, the annular recess 22' is utilised, which is set back in the annular flange 12 of the operating element 10, on the side opposite the axial bosses 14.

In conjunction therewith at least one of the wings of each clip 33 and in practice each of them has a transversely extending shoulder 48 for bearing on the side of the bearing plate 15 facing the axial bosses 14, in other words the side of the bearing plate which is remote from the side in contact with the transverse annular flange 12 of the operating element.

In the embodiment illustrated, this transverse shoulder 48 is obtained by turning back the wing 35 in question into a right-angled flange, this right-angled flange extending in a direction opposite to the other wing 35 of the respective clip.

Thus, the notches 17, by means of which the bearing plate 15 is engaged on the axial bosses 14, no longer directly border the radial lugs 18 of the bearing plate 15; these radial lugs 18 are bordered by notches 17' which are provided for the passage of the wings 35 of the clips 33, and, between the notches 17 and notches 17', there are radial lugs 18' on which said wings 35 bear via their shoulder 48.

Of course, the passages 46 of the annular flange 12 of the operating element 10, and the notches 17' of the bearing plate 15, are sufficiently developed circumferentially to permit the passage of the shoulders 48 of a clip 33 after the wings 35 of such a clip have been deflected towards each other.

By virtue of these shoulders 48, this clip, which, by its middle zone, bears on one side of the annular flange 12, retains the bearing plate 15 between this annular flange 12 on the other side thereof.

This clip therefore itself ensures that this bearing plate 15 is retained axially, or, in interaction with the other clip, at least participates in this retaining action.

For this reason and as illustrated, the pegs 19 which were previously used can be omitted.

A similar arrangement can be adopted with the embodiment described with reference to FIG. 9.

The present invention is not, of course, limited to the embodiments described and illustrated, but encompasses any alternative form, particularly as regards the connection of the cover 27 to the operating element 10, which can be accomplished in a different way from the way particularly described here.

Furthermore, the field of application of the invention is not limited to that of self-centering clutch release bearings, but extends to any type of clutch release bearing.

I claim:

1. A clutch release bearing comprising an operating element operable by a clutch control member, and a drive element actuable by said operating element and cooperable with a clutch release mechanism, said operating element comprising a transverse annular flange, a bearing plate overlying said transverse annular flange for contact with the clutch control member, and clips having elastically deformable lateral wings with a bight portion therebetween for providing an elastic snap-fit engagement of said clutch release bearing on the clutch control member, each of said clips defining an independent, generally U-shaped part, said bearing plate having lugs extending between said lateral wings of each respective clip and relatively adjacent said bight portion of each clip.

2. A clutch release bearing according to claim 1, wherein said operating element has a pair of axial bosses receiving each of said clips for circumferential retention of said clutch release bearing to the clutch control member, and said wings of each clip extends axially between and in contact with respective pairs of said bosses.

3. A clutch release bearing according to claim 2, wherein at least one of said wings of each clip has a transversely turned back free end in contact with a portion of the corresponding axial boss.

4. A clutch release bearing according to claim 3, wherein additional engaging means are provided between said at least one wing and its corresponding axial boss.

5. A clutch release bearing according to claim 4, wherein the said at least one wing is elastically snapped on said corresponding axial boss and said at least one wing has a projection in engagement in a recess formed in the adjacent side of the said corresponding axial boss.

6. A clutch release bearing according to claim 2, wherein a right-angled flange is provided along an edge of each of said wings and extends outwardly of its corresponding axial boss.

7. A clutch release bearing according to claim 2, wherein said bearing plate has notches for axial engagement of said axial bosses.

8. A clutch released bearing according to claim 1, further comprising a cover for axially connecting said drive element to said operating element, said cover having a front wall defining axially acting resilient means for bearing against said drive element, and a plurality of lugs for engagement with hook-shaped projections fixed relative to said operating element, said hook-shaped projections being peripherally spaced along and integral with said transverse annular flange.

9. A clutch release bearing according to claim 1, wherein said transverse annular flange has recess means axially set back relative to its front surface in contact with said bearing plate, for insertion of said bight portions.

10. A clutch release bearing comprising an operating element operable by a clutch control member and a drive element actuable by said operating element and cooperable with a clutch release mechanism, said operating element comprising a transverse annular flange lined on its surface by a bearing plate for contact with said control member, and clips having elastically deformable lateral wings and providing elastic snap-fit engagement of said clutch release bearing on said control member, each of said clips defining an independent, generally U-shaped part, the bight portion of each of said U-shaped parts being interposed between said bearing plate and said transverse annular flange of said operating element, under a radial lug defined by said bearing plate.

11. A clutch release bearing according to claim 10, wherein said transverse annular flange has recess means axially set back relative to its front surface remote from the surface in contact with said bearing plate, for receiving said bight portions.

12. A clutch release bearing comprising an operating element operable by a clutch control member and a drive element actuable by said operating element and cooperable with a clutch release mechanism, said operating element comprising a transverse annular flange lined on its surface by a bearing plate for contact with said control member, and clips having elastically deformable lateral wings and providing elastic snap-fit engagement of said clutch release bearing on said control member, each of said clips defining an independent, generally U-shaped part, the bight portion of each of said U-shaped parts being disposed on the side of said transverse annular flange facing towards said drive element, said lateral wings passing through said transverse annular flange and said bearing plate.

13. A clutch release bearing according to claim 12, wherein at least one of said wings comprises a transverse shoulder bearing on the side of said bearing plate remote from said transverse annular flange for at least participating in the axial retention of said bearing plate against said transverse annular flange.

* * * * *